Aug. 28, 1928.
E. H. STRONG
SAFETY DEVICE FOR LUBRICATING SYSTEMS
Filed Feb. 18, 1927 2 Sheets-Sheet 1
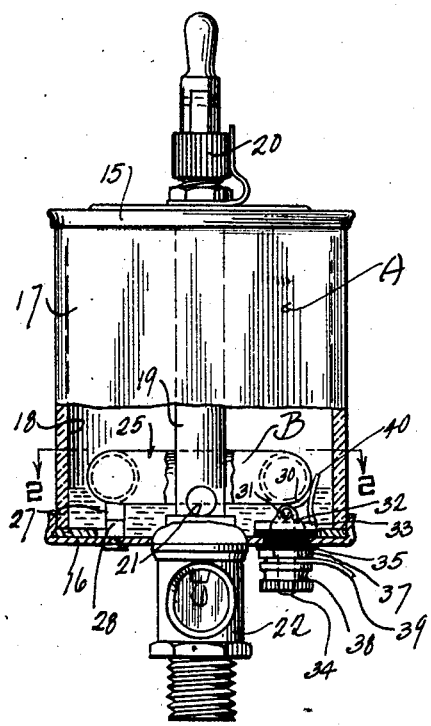
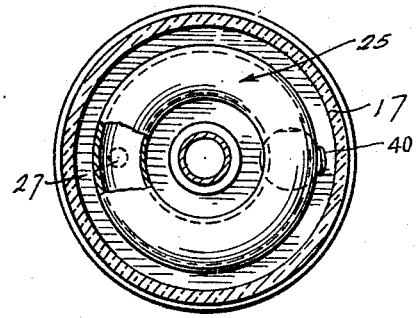
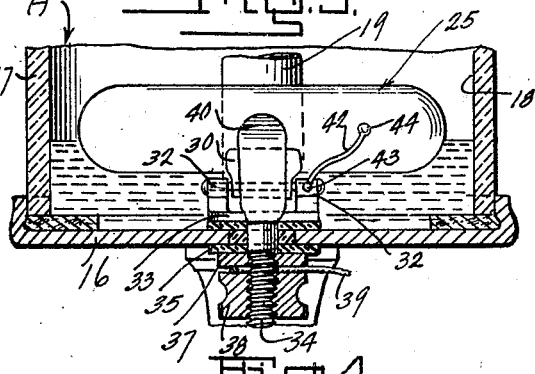
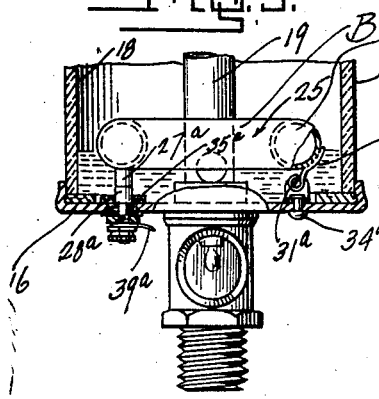
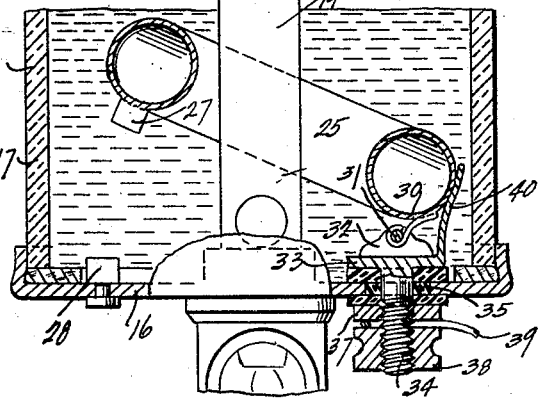
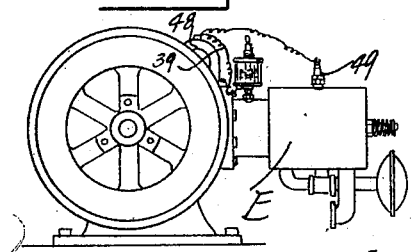
Eugene H. Strong
Inventor
By Lancaster and Allwine
Attorneys Aug. 28, 1928.
E. H. STRONG
1,682,257
SAFETY DEVICE FOR LUBRICATING SYSTEMS
Filed Feb. 18, 1927    2 Sheets-Sheet 2
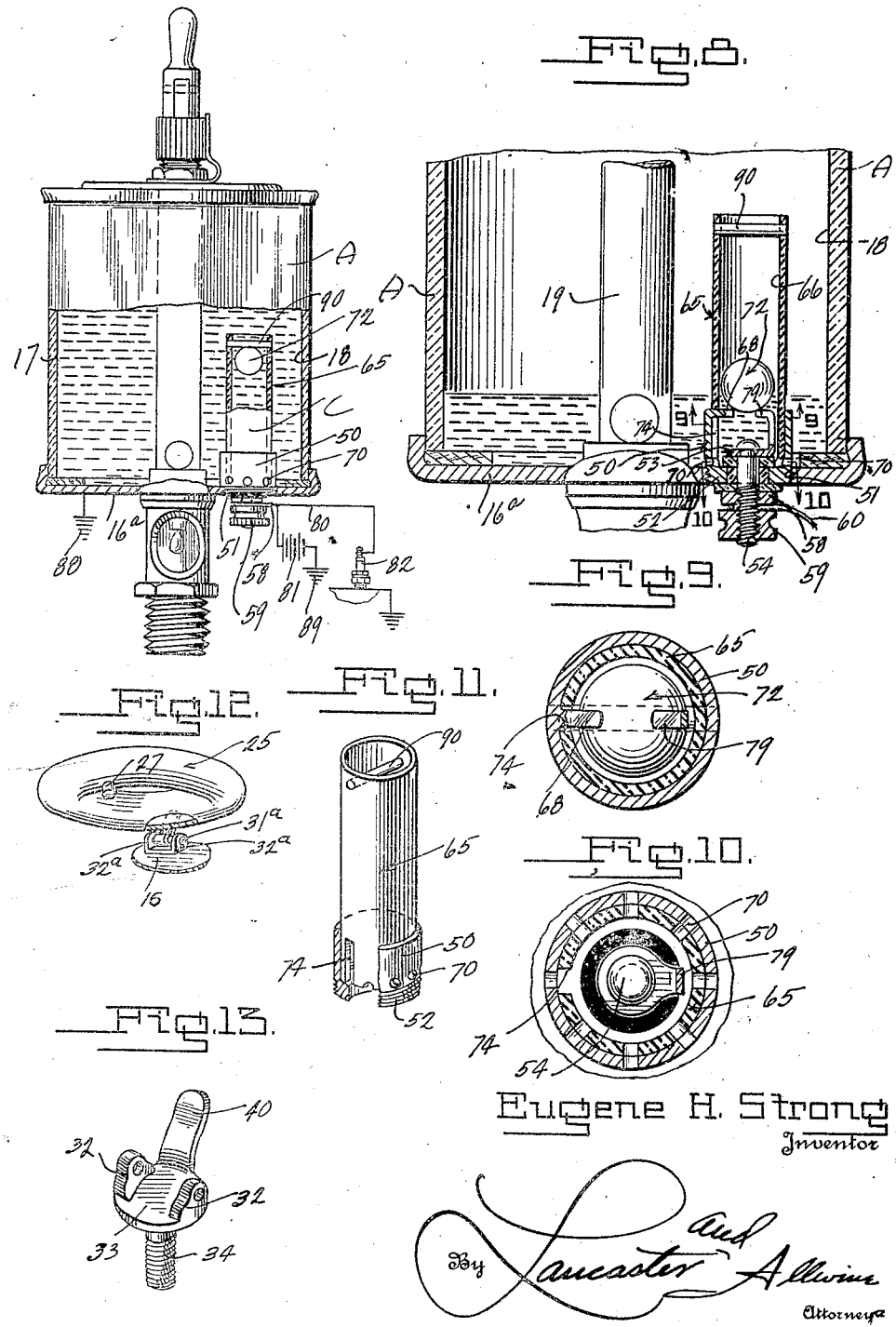
Eugene H. Strong
Inventor
By Lancaster and Allwine
Attorneys Patented Aug. 28, 1928.

1,682,257

UNITED STATES PATENT OFFICE.

EUGENE H. STRONG, OF PEARSALL, TEXAS.

SAFETY DEVICE FOR LUBRICATING SYSTEMS.

Application filed February 18, 1927. Serial No. 169,365.

This invention relates to improvements in protective devices for internal combustion engines or other machinery.

The primary object of this invention is the provision of an improved circuit maker and breaker device adapted to control the ignition, or supply a signal, when a supply of lubricant for an engine or other machinery becomes insufficient.

A further object of this invention is the provision of an improved circuit maker and breaker device adapted to be used in connection with conventional internal combustion engine lubricators, for shorting a circuit when the supply of lubricant is insufficient in the lubricator to take care of normal machinery lubrication.

Other objects and advantages of this invention will be apparent during the course of the following detailed description.

In the accompanying drawings, forming a part of this specification, and wherein similar reference characters designate corresponding parts througout the several views, Figure 1 is a side elevation, partly in section, showing a preferred type of float controlled circuit maker and breaker installed in a conventional type of lubricator.

Figure 2 is a tranverse sectional view taken substantially on the line 2—2 of Figure 1.

Figure 3 is an enlarged sectional view showing details of the float mechanism of the lubricator.

Figure 4 is an enlarged fragmentary sectional view showing the lubricator circuit maker and breaker in a circuit opening position which occurs when the lubricator is full of oil or lubricant.

Figure 5 is a view of a modified form of lubricator.

Figure 6 is a diagrammatic representation of the manner in which the lubricator and the circuit maker and breaker may be connected in circuit with details of an engine.

Figure 7 is a second modified form of lubricator protector device, showing in diagrammatic relation in an ignition circuit.

Figure 8 is an enlarged fragmentary sectional view of the second modified lubricator-protector, showing the circuit maker and breaker feature thereof as used for closing a circuit when the supply of lubricant is low.

Figures 9 and 10 are transverse sectional views taken substantially on their respective lines in Figure 8 of the drawings.

Figure 11 is a fragmentary perspective view of certain details of the modified form of lubricating circuit maker and breaker.

Figures 12 and 13 are perspective views of details of the circuit maker and breaker feature of the different forms of invention illustrated in Figures 1 to 5 inclusive.

In the drawings, wherein for the purpose of illustration are shown preferred and modified forms of the invention, the letter A may generally designate a lubricator of conventional character, with which the preferred form of circuit maker and breaker B is associated, being operated by the supply of lubricant in the lubricator A. For the lubricator A modified forms of circuit maker and breaker devices C and E may be provided if desired.

The lubricator A for the forms of invention is of that type known in the art as the sight feed oil cup or lubricator, including preferably top and bottom metallic walls 15 and 16, connected with a cylindrical shaped transparent glass body 17, defining a compartment 18 wherein the supply of lubricant is normally maintained. A feed tube 19 is axially disposed thru the compartment 18, extending thru the top wall 15 where the same receives lubricant regulating means 20, and the tube 19 is provided with an opening 21 therein so that the lubricant may pass from the compartment 18 into a sight feed receptacle 22, located below the bottom wall 16, which affords means to the operator to see and observe the amount of lubricant which is dripping into the engine or other piece of machinery, for lubrication purposes.

As to the improved circuit maker and breaker device B, the same preferably includes a preferably hollow ring-shaped metallic float 25, having a large central opening axially therethrough for freely receiving the stem 19. On the under surface thereof the float 25 is provided with a contact 27, which cooperates with a stationary contact 28 grounded on the bottom wall 16. At a diametrically opposed location, the float 25 is provided with a hinge leaf 30, oscillatively mounted upon a pintle 31 which is supported at its ends upon preferably upstanding ears 32, mounted on the preferably flat head 33 of a detachable terminal screw 34, which is mounted in an insulated relation upon the bottom wall 16, by means of an insulation bushing 35, of any approved construction. To this end the bottom wall 16 is provided with an opening therethrough which receives the bushing, so that the head 33 is insulated from the bottom wall, and also the screw threaded shank of the terminal screw 34 extends downwardly exteriorly of the bottom wall 16, and is there provided with an adjustable nut 37 as a means of clamping the terminal screw in rigid position on the bottom wall 16. The screw threaded shank of the terminal screw 34 also receives a terminal nut 38 cooperating on the shank of the terminal screw 34 for clamping a conducting wire 39 between the nuts 37 and 38, in a relation well illustrated in Figure 4 of the drawings.

The float 25 is hingedly mounted in the compartment 18, and due to the fact that the same has a hollow closed compartment therein, is buoyant, and will rise and fall with the supply of lubricant in the compartment 18. Being hinged at one side of the lubricator, the float 25 will rise and fall so that the contact 27 moves towards or away from the contact 28, depending upon the level of the lubricant. The opening thru the ring-shaped float 25 is relatively large, so that a considerable arc of movement of the float 25 may be accomplished without the said float contacting the tube 19, as is illustrated in different positions illustrated in Figures 1 and 4 of the drawings. However, when the lubricator is completely full of oil, in order to prevent the float 25 from grounding on the tube 19, it is preferred to provide a stop finger 40, which may be more or less resilient, but the function of which is to engage the float 25 when the same has risen with the lubricant to a predetermined level, and thus stopping the further upward swing of the float 25, short of contact with the tube 19, in the relation of parts illustrated in Figure 4 of the drawings.

In order to insure a positive electrical contact of the float 25 with the terminal screw 34, at all times, a flexible wire connector 42 is provided, connected at one end 43 on one of the ears 32 of the terminal screw, and connected at its other end 44 in a soldered or otherwise secured relation on the float 25.

As to the manner of serving as a protector, the contact 28 may be grounded on the bottom 16, and when the lubricator is mounted upon an engine, such as the engine E of Figure 6, the lubricator is of course grounded on the engine casing. The terminal screw 34 has the wire 39 thereof leading to a current supply source 48, connected in circuit therewith so that when the float 25 operates to close the circuit between the contacts 28 and 34, the ignition circuit spark plugs 49 of the engine E will be short circuited, thus cutting the engine out of operation. In lieu of such construction, the circuit maker and breaker formed by the float 25 and contacts 28 and 35 may be used for closing a circuit, to signal, or for other purposes, consistent with the application of the protector device on a particular type of machinery. If desired in the modified form of invention, the float 25 may be directly hinged by leaf $30^a$ to pintle $31^a$, the latter being secured in ears $32^a$ and grounded on the bottom of the lubricator casing, and the circuit maker and breaker terminal $28^a$ insulated from the bottom 16, and connected to wire $39^a$, as illustrated in Figure 5.

In the second modified form of invention, the circuit maker and breaker C preferably includes a brass or other metallic sleeve or seat 50, of hollow cylindrical formation, screw threaded at its lower end, for seating in a screw threaded opening 51 provided in the bottom $16^a$ of the lubricator A, as illustrated in Figure 8 of the drawings. The bottom 52 of the sleeve 50 is preferably provided with an opening therethrough adapted to receive an insulation bushing 53, thru which axially extends a terminal screw or member 54, the head end of which extends into the compartment of the sleeve 50; it being intended that the sleeve 50 is to be seated in the compartment 18 of the lubricator A, as illustrated in Figure 8. The terminal screw 54 is thus insulated from the sleeve 50, and from the bottom $16^a$ of the lubricator, and the screw threaded shank thereof extends exteriorly of the casing of the lubricator, and receives a clamping nut 58 thereon, which clamps the same in position upon the bushing; the lowermost screw threaded end of the terminal screw 54 having a terminal binding nut 59 thereon in cooperation with the nut 58 in receiving a clamped wire 60 therebetween, forming part of a circuit.

A detachable, preferably insulation sleeve 65, is detachably seated in the metal seat 50, having the upper and lower ends thereof open and a passageway 66 therethrough within which is freely received a metallic spherical shaped float 72 adapted to rise and fall in the passageway 16 according to the level of lubricant therein and in the lubricator A. The cylindrical shaped body 65 is open at the lower end thereof to admit lubricant. The sleeve 50 at the lower end thereof immediately above the base $16^a$ of the lubricator is provided with transverse ducts 70, and similarly the sleeve 65 may be prvoided with ducts to align with the ducts 70. The sleeve 50 at the upper end thereof is provided with a laterally extending contact 68 integral or rigid therewith, extending laterally towards the axis of the sleeve 50, and the insulation sleeve 65 is slotted at 74 to slip down over this contact 68 and thus seat the insulation sleeve 65 against rotation, to align the ports 70 with the ducts in the lower end of the sleeve 65, to permit lubricant to pass from the lubricator compartment 18 thru the ducts 70 and into the interior of the insulation sleeve or body 65, to rise and fall therein on a level with the level of the lubricant in the compartment 18.

The terminal screw 54, within the compartment of the insulation sleeve 65 is provided with a contact 79 connected in a rigid relation on the head of the terminal 54, insulated from the bottom 16$^a$ and from the sleeve 50, and from the sleeve 65, the upper end of said contact 79 being inturned on a level with the contact 68, and spaced from the contact 68; it being intended that the spherical float 72 shall be a conductor and when the level of the lubricant has fallen in the compartment 66 of the insulation sleeve 65, the float 72 will act as a bridge between the contacts 68 and 79 for closing a circuit, either to signal, or short circuit part of an ignition system. The cooperation of the circuit maker and breaker C in an ignition system of conventional arrangement is illustrated diagrammatically in Figure 7, wherein it is shown that the wire 58 may be connected in the ignition circuit 80 close to the battery 81, to short circuit a spark plug 82, or the like; it being intended that the contact 68 shall be grounded on the bottom 16$^a$ of the lubricator casing and the latter shall be grounded at 88 in the same circuit as the ground 89 of the battery 81.

From the foregoing description of this invention it is apparent that novel circuit maker and breaker or protectors have been provided to be used in connection with the protection of machinery, against damage due to low lubricant supply. The operation of the float 72 is perfectly obvious, since it only closes the circuit across the contacts 68 and 79 when the lubricant in the lubricator has reached a low level. During normal supply of lubricant in the lubricator A, the float 72 is elevated above the contacts 68 and 79, and it is retained against displacement from the compartment 66 of the insulator sleeve 65, by means of a cross pin 90, which may be placed in the top of the sleeve 65, as illustrated in Figures 7 and 8 of the drawings.

From the foregoing description of this invention it is apparent that novel lubricators embodying safety circuit makers and breakers have been provided, adapted to signal or shunt the ignition system of internal combustion engines, to prevent damage thereto incident to lack of lubricant.

Various changes in the shape, size, and arrangement of parts may be made to the forms of invention herein shown and described, without departing from the spirit of the invention or the scope of the claims.

I claim:

1. In a circuit maker and breaker for lubricators the combination of a lubricator having a housing with a metal bottom and a compartment therein, a float operable in the compartment with rise and fall of lubricant therein, and a pair of contacts directly carried by said bottom for engagement by the float to bridge the contact at a predetermined low level of lubricant in the compartment, one of said contacts being grounded on the metal bottom and the other contact being insulated upon said bottom, and the float being of metal.

2. In a protecting device for machinery the combination of a lubricator having a metal bottom and a compartment therein for receiving lubricant, a contact grounded on said bottom, a second contact carried by the bottom and insulated with respect thereto, a float in the compartment hinged to said second contact and adapted to engage the first contact at a low level of lubricant in the compartment.

3. In a protecting device for machinery the combination of a lubricator having a metal bottom and a compartment therein for receiving lubricant, a contact grounded on said bottom, a second contact carried by the bottom and insulated with respect thereto, a float in the compartment hinged to said second contact and adapted to engage the first contact at a low level of lubricant in the compartment, and means for limiting the elevated movement of the said float in said compartment.

4. In a circuit maker and breaker device for lubricators the combination of a lubricator casing having a metal bottom, a contact grounded on said bottom, a second contact insulated on said bottom, a ring-shaped metal float hinged on said second contact and adapted to engage the first contact for bridging said contacts at a predetermined low level of lubricant in said compartment.

5. In a lubricator the combination of a lubricator including a casing having a metal bottom and an axially extending stem through the compartment of the casing, a substantially ring-shaped hollow float about said stem in the compartment of the casing, a contact on the metal bottom grounded thereon at one side of the stem, a second contact on the metal bottom insulated thereon at the opposite side of the stem from the first mentioned contact, means hinging the float on the second mentioned contact so that it may engage the first mentioned contact at a low level of lubricant in the compartment to bridge said contacts.

6. In a lubricator the combination of a lubricator including a casing having a metal bottom and an axially extending stem through the compartment of the casing, a substantially ring-shaped hollow float about said stem in the compartment of the casing, a contact on the metal bottom grounded thereon at one side of the stem, a second contact on the metal bottom insulated thereon at the opposite side of the stem from the first mentioned contact, means hinging the float on the second mentioned contact so that it may engage the first mentioned contact at a low level of lubricant in the compartment to bridge said contacts, and means for limiting the elevation of said float in the compartment so that it will not touch said stem.

EUGENE H. STRONG.